(12) United States Patent
Kim et al.

(10) Patent No.: US 7,830,961 B2
(45) Date of Patent: Nov. 9, 2010

(54) MOTION ESTIMATION AND INTER-MODE PREDICTION

(75) Inventors: Changick Kim, Yuseong-gu (KR); William Chen, Foster City, CA (US); Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 1541 days.

(21) Appl. No.: 11/158,548

(22) Filed: Jun. 21, 2005

(65) Prior Publication Data

US 2006/0285594 A1 Dec. 21, 2006

(51) Int. Cl.
*H04N 11/02* (2006.01)
*H04N 7/12* (2006.01)
*H04N 11/04* (2006.01)
*H04B 1/66* (2006.01)

(52) U.S. Cl. .................. 375/240.16; 375/240.24; 375/240.12

(58) Field of Classification Search .......... 375/240, 375/240.16
See application file for complete search history.

(56) References Cited

U.S. PATENT DOCUMENTS

| | | | |
|---|---|---|---|
| 6,526,096 B2 | 2/2003 | Lainema et al. | |
| 6,646,578 B1 | 11/2003 | Au | |
| 6,674,911 B1 | 1/2004 | Pearlman et al. | |
| 6,711,212 B1 | 3/2004 | Lin | |
| 6,728,315 B2 | 4/2004 | Haskell et al. | |
| 6,757,330 B1 | 6/2004 | Hsu | |
| 6,763,068 B2 | 7/2004 | Oktem | |
| 6,785,333 B2 | 8/2004 | Yoo | |
| 6,795,584 B2 | 9/2004 | Karczewicz et al. | |
| 6,798,977 B2 | 9/2004 | Maeda | |
| 2002/0110194 A1 | 8/2002 | Bottreau | |
| 2003/0058949 A1 | 3/2003 | MacInnis et al. | |
| 2003/0112873 A1 | 6/2003 | Demos | |
| 2003/0202607 A1 | 10/2003 | Srinivasan | |
| 2004/0001546 A1 | 1/2004 | Tourapis et al. | |
| 2004/0013199 A1 | 1/2004 | Winger et al. | |
| 2004/0028131 A1 | 2/2004 | Ye et al. | |
| 2004/0057624 A1 | 3/2004 | Wells | |
| 2004/0062307 A1 | 4/2004 | Hallapuro et al. | |
| 2004/0131121 A1 | 7/2004 | Dumitras et al. | |

(Continued)

FOREIGN PATENT DOCUMENTS

WO   WO 02/071741   9/2002

(Continued)

OTHER PUBLICATIONS

Jeon ae al., "Fast mode decision for H.264", JVT-J033, Dec. 2003.*

(Continued)

*Primary Examiner*—Andy S. Rao
*Assistant Examiner*—Hee-Yong Kim

(57) ABSTRACT

An inter-mode for encoding a video macroblock is selected based on a comparison of at least two rate-distortion values associated with inter-modes. The number of potential inter-modes for encoding the video macroblock is initially reduced based on the rate-distortion calculation of the SKIP mode between the current macroblock and the collocated macroblock (corresponding to a 0,0 motion vector). Motion estimation is performed on the remaining inter-modes to identify reference blocks and motion vectors. The number of calculations performed in identifying the reference blocks and motion vectors is potentially reduced because associations between inter-modes are recognized and leveraged.

12 Claims, 6 Drawing Sheets

U.S. PATENT DOCUMENTS

| | | | |
|---|---|---|---|
| 2004/0170333 | A1 | 9/2004 | Toivonen et al. |
| 2004/0170395 | A1 | 9/2004 | Filippini et al. |
| 2004/0190616 | A1 | 9/2004 | Linzer et al. |
| 2004/0233993 | A1 | 11/2004 | Johansen et al. |
| 2004/0240549 | A1 | 12/2004 | Cote et al. |
| 2004/0252760 | A1 | 12/2004 | Winger |
| 2004/0252768 | A1 | 12/2004 | Suzuki et al. |
| 2004/0252901 | A1 | 12/2004 | Klein Gunnewiek et al. |
| 2005/0025249 | A1 | 2/2005 | Zhao et al. |
| 2005/0089099 | A1* | 4/2005 | Lee ............... 375/240.16 |
| 2006/0002474 | A1* | 1/2006 | Au et al. ............... 375/240.16 |
| 2006/0039470 | A1* | 2/2006 | Kim et al. ............... 375/240.16 |
| 2006/0062302 | A1* | 3/2006 | Yin et al. ............... 375/240.16 |
| 2006/0104359 | A1* | 5/2006 | Zhou et al. ............... 375/240.16 |
| 2008/0008242 | A1* | 1/2008 | Lu et al. ............... 375/240.16 |

FOREIGN PATENT DOCUMENTS

WO     WO 2004/080084     9/2004

OTHER PUBLICATIONS

Yin et al., "Fast Mode Decision and Motion Estimation for JVT/H.264", IEEE, 2003.*

"Sobol Partial Distortion Algorithm for Fast Full Search in Block Motion Estimation", D. Quaglia, et al., Proceedings of EuroGraphics Multimedia Workshop 2001, Manchester, United Kingdom, Sep. 2001, pp. 87-94.

Sullivan, G., et al., "Video Compression—From Concepts to the H.264/AVC Standard", Proceedings of the *IEEE*, vol. 93, No. 1, Dec. 2004, pp. 18-31.

He, Zhihai, et al., "A Unified Rate-Distortion Analysis Framework for Transform Coding", *IEEE* Transactions on Circuits and Systems for Video Technology, vol. 11, No. 12, Dec. 2001, pp. 1221-1236.

Hyungjoon Kim, et al., "Low-Complexity Macroblock Mode Selection for H.264/AVC Encoders", *IEEE* International Conference on Image Processing, Oct. 2004.

"Efficient Intra-Prediction Algorithm in H.264", B. Meng, et al., 2003, pp. 837-840.

"H.264 and MPEG-4, Video Compression, Video Coding for Next-generation Multimedia", Iain E.G. Richardson, 2003, pp. 170-185.

Chen, et al., "Efficient Block Size Selection for MPEG-2 to H..264 Transcoding", pp. 300-303, 2004.

* cited by examiner

MOTION ESTIMATION AND INTER-MODE PREDICTION

BACKGROUND

A. Technical Field

The present invention relates generally to the encoding of data for transmission along a communications link, and more particularly, to the selection of modes by which data is encoded prior to transmission.

B. Background of the Invention

The burden of high bandwidth applications, such as voice and video, on networks is continually increasing. To facilitate these bandwidth-hungry applications, compression technology and standards are evolving to allow data from these applications to be more effectively communicated across a network to a client. Two such standards are H.264 and MPEG-4 which relate to the encoding and decoding of video signals. Although these standards generally improve the method in which data is encoded, they may also place a significant strain on the processing resources of the encoder itself. Because of the time-sensitive nature of transmitting and receiving video data, an encoder has a limited amount of time to select an appropriate encoding method for a video frame, encode the video frame, and transmit the frame onto a network. The quality of the video signal may be jeopardized if the encoder is unable to complete all of the necessary encoding computations, within the requisite time, that may be needed to encode and transmit the video signal.

FIG. 1 illustrates a typical communications link 120 on which an encoded video signal may be communicated. As illustrated, a video camera 110 generates a video signal that is sent to an encoder 115. This encoder 115 may be software located on a computer or server that is connected to the communications link 120. The encoder 115 receives a video frame that is typically divided into macroblocks for encoding purposes. Depending on the content in these macroblocks, they may be further partitioned into smaller blocks to allow more precision in the encoding process.

Each of these macroblocks, and sub-blocks within a macroblock, may be encoded relative to another block located within the same video frame or relative to a block in a previous or future reference frame within the video signal. There are typically two types of modes, intra and inter-mode, in which a macroblock may be encoded. Intra-mode encoding means that encoding occurs relative to blocks within the same video frame. Inter-mode encoding means that encoding occurs relative to one or more reference frames outside the current video frame. After a macroblock is encoded, it is transmitted, via the communications link 120, to a receive-side decoder 125. The decoder 125 reconstructs the macroblock within the video signal so that it may be shown on the display device 130.

As mentioned above, when inter-mode encoding is performed, a macroblock (e.g., a 16×16 block within a video frame) is encoded relative to a macroblock in another reference frame. The distortion between macroblocks is calculated by taking the difference between the current macroblock and the reference macroblock in the reference frame. The encoder may select from a number of different inter-modes to encode a particular macroblock. The chosen mode is the one that minimizes some criteria such as the joint rate-distortion function. Using the rate-distortion criteria, if there is very little distortion between macroblocks, the macroblock may be encoded as SKIP mode. Comparatively, if a relatively large amount of distortion exists, then other modes are searched in order to reduce the rate-distortion criteria.

The selection of an encoding inter-mode for a macroblock typically requires significant computations. These computations require time, processor bandwidth and memory resources to be completed. This delay and demand on system resources may adversely affect the performance of the encoding process and the display of the video signal at the receiver side of a connection.

SUMMARY OF THE INVENTION

The present invention is adapted to reduce the processing requirements in selecting an inter-mode for encoding a video frame macroblock. In one embodiment of the invention, the amount of distortion within the macroblock is approximated, such as through a rate-distortion ("RD") computation, so that the number of potential inter-modes may be reduced without further analysis. This RD computation may be accomplished by calculating a RD cost for a SKIP mode that represents distortion within the macroblock relative to a (0,0) motion vector. Thus, depending on the value of the SKIP mode RD cost, the number of inter-modes that are further analyzed may be reduced, and in some cases significantly reduced, as certain inter-modes are filtered out according to this RD cost value.

To further speed up the process, fast motion estimation is performed on various inter-mode block types to identify reference blocks and motion vectors. These reference blocks and motion vectors may be used to compute RD costs for corresponding inter-modes which may be analyzed to identify an appropriate mode for encoding the macroblock. In one aspect, the present invention is directed to reducing the number of computations that would otherwise be required in the identification of each of these reference blocks and motion vectors. Thus in one embodiment of the invention, a reference block ("seed block") and motion vector ("seed motion vector") for one inter-mode block type, e.g., 8×8 block type, is used to select an initial search point for another reference block and motion vector associated with a different inter-mode block type. The use of the seed block and motion vector allows the computations, previously performed for one mode, to be leveraged in the analysis of a different mode, thereby reducing the number of computations required to analyze the different mode. Furthermore, iterative search processes may be employed during the identification of a seed block and seed motion vector, and during motion estimation on blocks within a macroblock.

Based on the calculated RD efficiencies, an appropriate mode is selected, after which the macroblock is encoded according to that mode and transmitted onto a communications link. The macroblock is then decoded and displayed at a receive-side client on the link.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
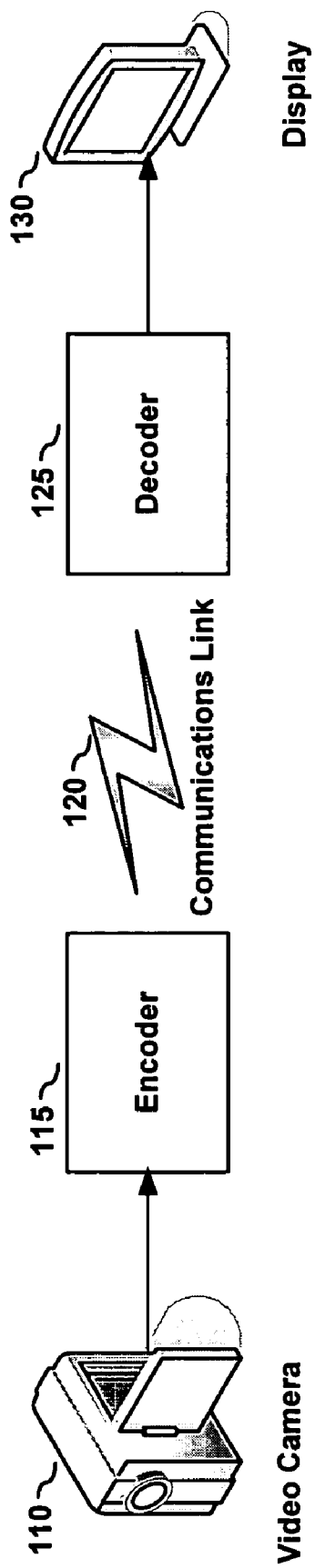
FIG. 1 is an illustration of a communication link on which data may be encoded and decoded.

An apparatus and method for selecting an inter-mode for encoding a macroblock in a video frame is described. In one embodiment of the present invention, the number of potential inter-modes is filtered, after an initial rate-distortion calculation for a macroblock, in order to reduce the number of modes that are analyzed. A seed reference frame and seed motion vector are identified for a particular mode and subsequently used in the analysis of other potential modes that may be used to encode the macroblock. The initial filtering of prediction modes and use of seed reference frames and motion vectors reduces the number of calculations performed during selection of an inter-mode; thereby reducing the resources and time required to encode the video signal.

In the following description, for purpose of explanation, specific details are set forth in order to provide an understanding of the invention. It will be apparent, however, to one skilled in the art that the invention may be practiced without all of these details. One skilled in the art will recognize that embodiments of the present invention, some of which are described below, may be incorporated into a number of different devices including personal computers and network servers. The embodiments of the present invention may also be present in software, hardware or firmware. Structures and devices shown below in block diagram are illustrative of exemplary embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The present invention identifies an inter-mode that may be used to encode a video signal macroblock. The selection of an inter-mode for a particular video signal macroblock may depend on a number of factors including rate-distortion efficiencies associated with modes in which the particular macroblock may be encoded. The amount of distortion within the particular macroblock is particularly determinative in each mode's rate-distortion performance. Depending on the mode that is selected, the macroblock may be partitioned into various sub-blocks. Typically, the complexity and required number of computations for an encoding process increases relative to the number of sub-blocks in which the macroblock is divided. Thus, as a macroblock is partitioned into more sub-blocks, the complexity of the mode in which the macroblock is encoded becomes more complex and more able to compensate for larger amounts of distortion.

One factor that may be used in selecting an appropriate inter-mode is a RD cost computed for each mode. An analysis of each mode's RD cost allows for the selection of an appropriate prediction inter-mode for a particular block. However, these rate-distortion computations may be processor intensive and place a burden on the encoder to timely encode the video signal. The rate-distortion value is defined as:

$$J(s, c, m \mid QP, \lambda_m) = SSD(s, c, m \mid QP) + \lambda_m * R(s, c, m \mid QP),$$

where QP is the macroblock quantization parameter, $\lambda_m$ is the Lagrange multiplier for mode decisions, SSD is the sum of the squared differences between the original block and a reconstructed block, and R represents the number of bits associated with the mode.

The complexity of the rate-distortion computation, and the number of times the computation is performed, directly affects the time and resources required to identify a prediction mode for a block. Depending on the encoder, and the system in which the encoder operates, these computations may overload the encoder resulting in a degradation of the encoding system performance.

The present invention is directed to reducing the number of inter-modes that are analyzed and the number of computations for those modes that are analyzed during selection of an encoding mode for a macroblock. According to one embodiment, an initial RD cost calculation is performed for a SKIP mode in order to estimate the amount of distortion within the macroblock and thereafter to exclude certain other modes from analysis. For example, if the calculation suggests that the level of complexity required to encode the macroblock is low, then a first set of inter-modes are analyzed. As the rate-distortion of encoding the macroblock increases, as inferred from the calculated RD cost, then a second set of inter-modes is analyzed. Additionally, to reduce the number of computations performed in mode analysis, a seed reference block and motion vector from one mode may be leveraged to simplify the identification of reference blocks and motion vectors for other modes.

Rate-distortion computations may then be performed on each of the analyzed modes so that an appropriate mode is selected for encoding. Thereafter, the macroblock is encoded and transmitted onto a communication link. A client at the other end of the link receives this information and reconstructs the macroblock.

B. Encoder

Figure 2:
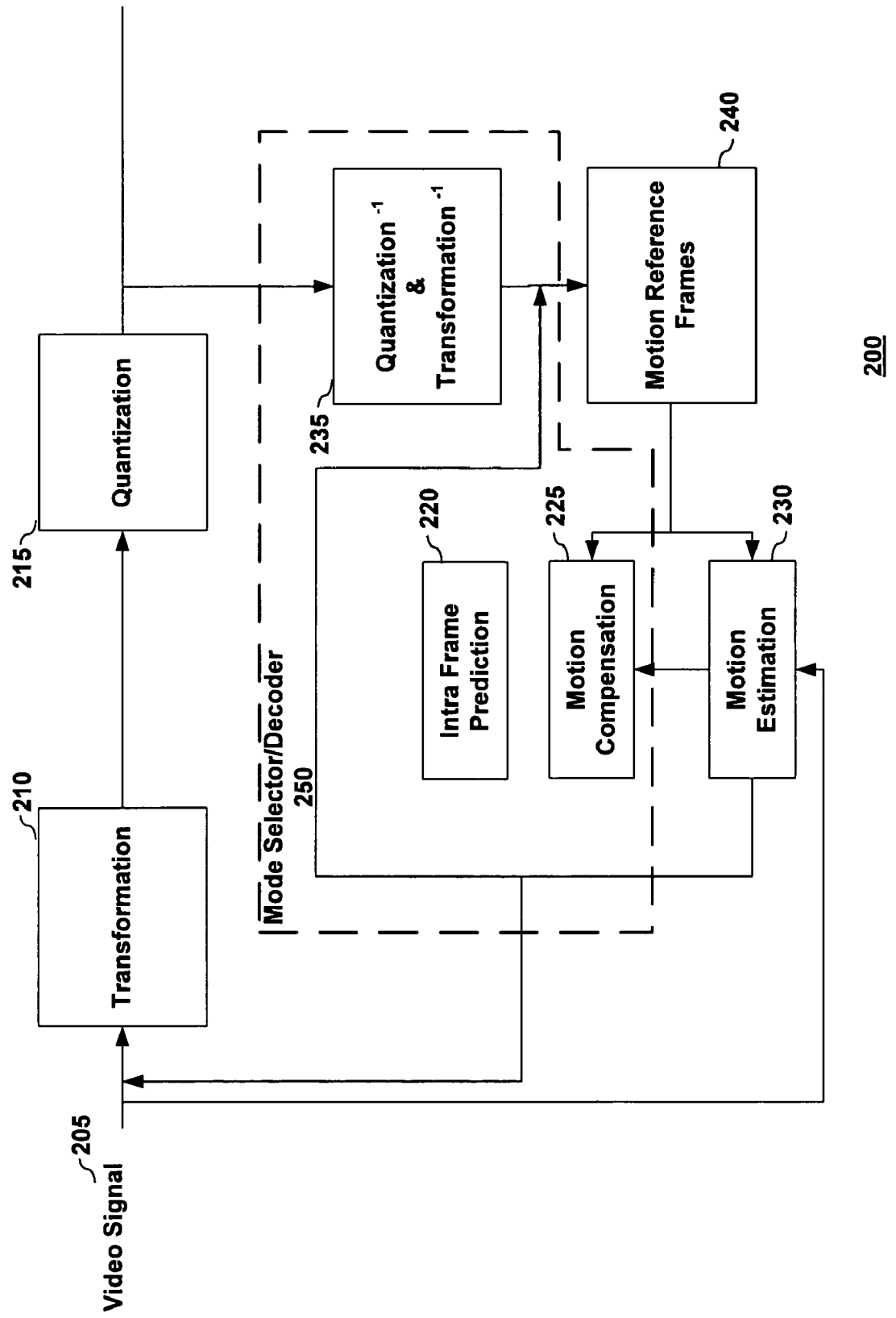
FIG. 2 is a general block diagram of an encoder according to one embodiment of the invention.

FIG. 2 illustrates an encoder 200, including a mode selector 250, according to one embodiment of the invention. A frame within a video signal 205 is transformed by a transformation module 210, using a discrete cosine transform ('DCT'), into a set of spatial frequency coefficients. The frequency coefficients are then quantized by a quantization module 215 that applies a scalar to the frequency coefficients. In effect, the quantization process divides each of the frequency coefficients by an integer-scaling factor resulting in truncated signal values. This process of transforming and quantizing the video frame introduces error, such as lost data, into the video signal.

The encoder 200 also includes a mode selector 250 that identifies a inter-mode or modes in which each macroblock in a frame is encoded. This mode selector 250 includes an inverse quantization and transformation module 235, an intra-frame prediction module 220, and a motion compensation module 225. The mode selector 250 may interface with or include a motion estimation module 230 and a memory device 240 that stores multiple motion reference frames.

The inverse quantization and transformation module 235 reconstructs a macroblock that had been previously transformed and quantized so that the amount of error introduced into the video signal by the encoding processing may be identified. Reconstruction occurs by inverse quantizing a video signal, which results in a rescaled signal. This rescaled signal is then inversely transformed by an Inverse DCT (IDCT) to produce a reconstructed frame. This reconstructed frame may be compared to the original video frame 205 to identify the error introduced by the encoding process. Each macroblock within the video signal 205 may be encoded in one of multiple different inter or intra-prediction modes, each having a particular associated error value.

The intra frame prediction module 220 identifies a potential prediction intra-mode for a macroblock. As mentioned above, intra-mode encoding uses other blocks within the same video frame to predict a particular block in an intra frame. This identified intra-mode is compared to an inter-mode to determine whether a macroblock should be encoded using an inter or intra-mode. An intra-mode may be selected using numerous different methods and devices including those described in the U.S. patent application entitled "Prediction Mode Selection in an Encoder," U.S. patent application Ser. No. 11/041,141, filed on Jan. 21, 2005, which is incorporated by reference in its entirety.

The motion estimation module 230 identifies a reference block and a motion vector representative of a spatial displacement between the reference block and the block that is to be encoded in an inter-mode. The reference block may be located within a single video reference frame or may be generated from multiple blocks within a reference frame or multiple reference frames. The motion vector represents movement of the reference block within a two-dimensional grid relative to the position of the block that is to be inter-mode encoded.

The motion compensation module 225 predicts a macroblock from other previously decoded blocks in previous frames that may be used in an inter-mode coding process. This prediction is done by identifying an error or distortion level associated with the reference block and motion vector relative to the particular block that is to be inter-mode encoded. This error is encoded and provided to a receiving client so that the particular block may be reconstructed from the reference block and motion vector data. As described above, each inter-mode will have an associated error value for the particular block. This error value is a significant component in the rate-distortion performance of each of the modes and may be an important consideration in the selection of a single inter-encoding mode for the particular block.

Once an encoding mode has been selected (either inter or intra-mode), the macroblock is encoded accordingly and transmitted onto a communication link. This encoded data may be used by a client to reconstruct this macroblock (and other encoded macroblocks of the same frame) for display.

C. Inter-Mode Encoding and Motion Vector Search

Figure 3:
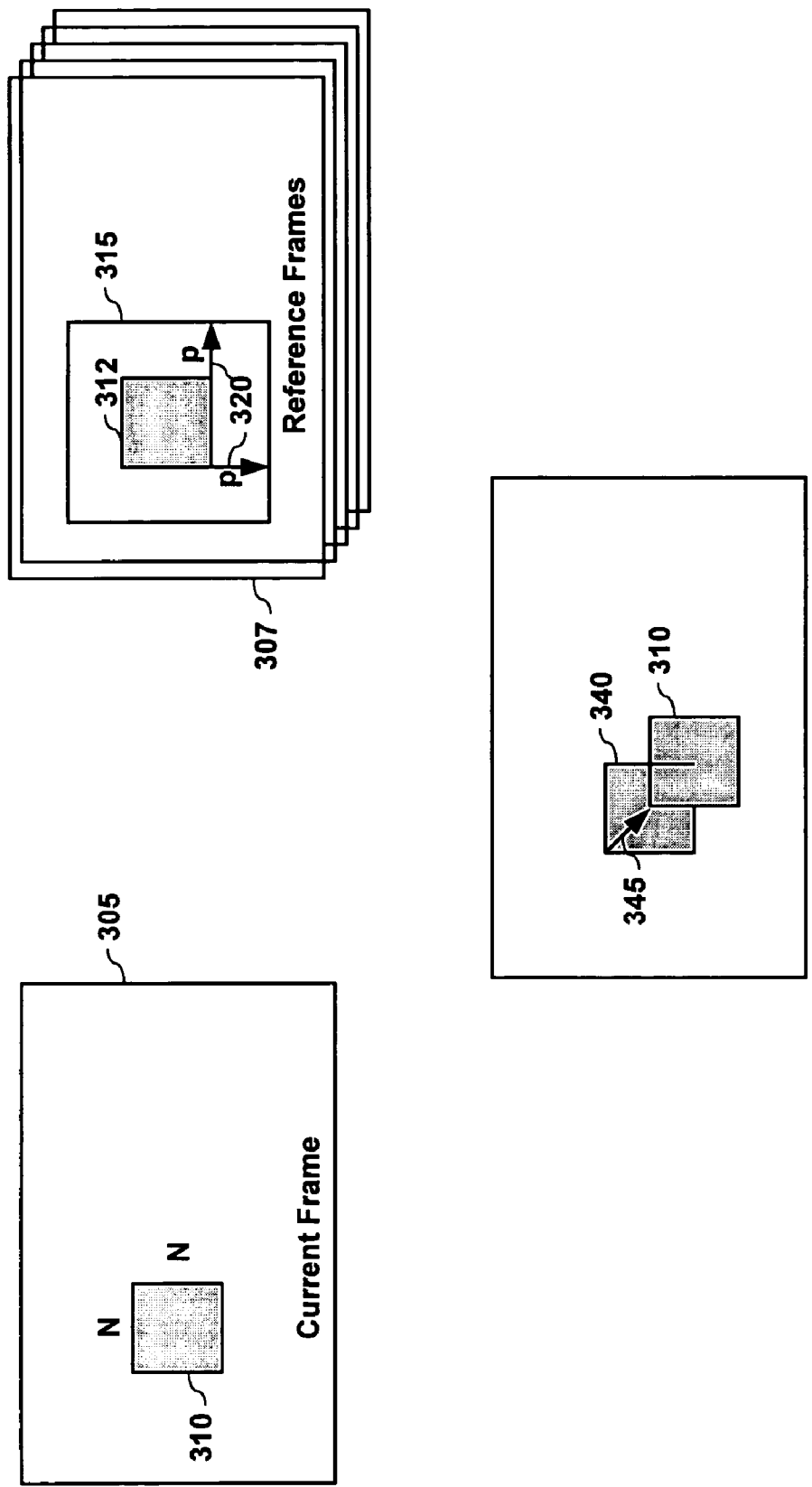
FIG. 3 is a general illustration of motion estimation and inter-mode prediction according to one embodiment of the invention.

FIG. 3 is a general diagram illustrating motion estimation including reference block and motion vector search. That figure shows a video frame 305 and a macroblock 310 within the frame 305 itself. The macroblock 310 may be a 16×16 macroblock, as defined by the H.264 standard, or any other suitable size.

Multiple reference frames 307 may be analyzed to identify a reference block for the macroblock 310. One method for identifying a reference block is searching a predefined area 315 in each of the video reference frames 307 for a block that is similar to the macroblock 310. For example, a search area may be defined in each of the reference frames 307 as a distance p 320 in both the X and Y directions from a block location 312 corresponding to the same location as the macroblock 310 in its own frame. This search, within the search area 315, attempts to identify a block that is most similar to the macroblock 310. After an appropriate block is identified in the search, this block is identified as the reference block 340 for the macroblock 310.

A motion vector 345 is generated to relate the spatial displacement between the reference block 340 to the macroblock 310. The motion vector has a directional value and a magnitude value so that movement on a two dimensional grid may be shown. Using inter-mode encoding, the reference block 340, the motion vector 345, and error or distortion between the reference block 340 and the macroblock 310 are provided so that the macroblock may be reconstructed on a display of the video signal.

a) Prediction Inter-Modes as Defined by H.264

Figure 4:
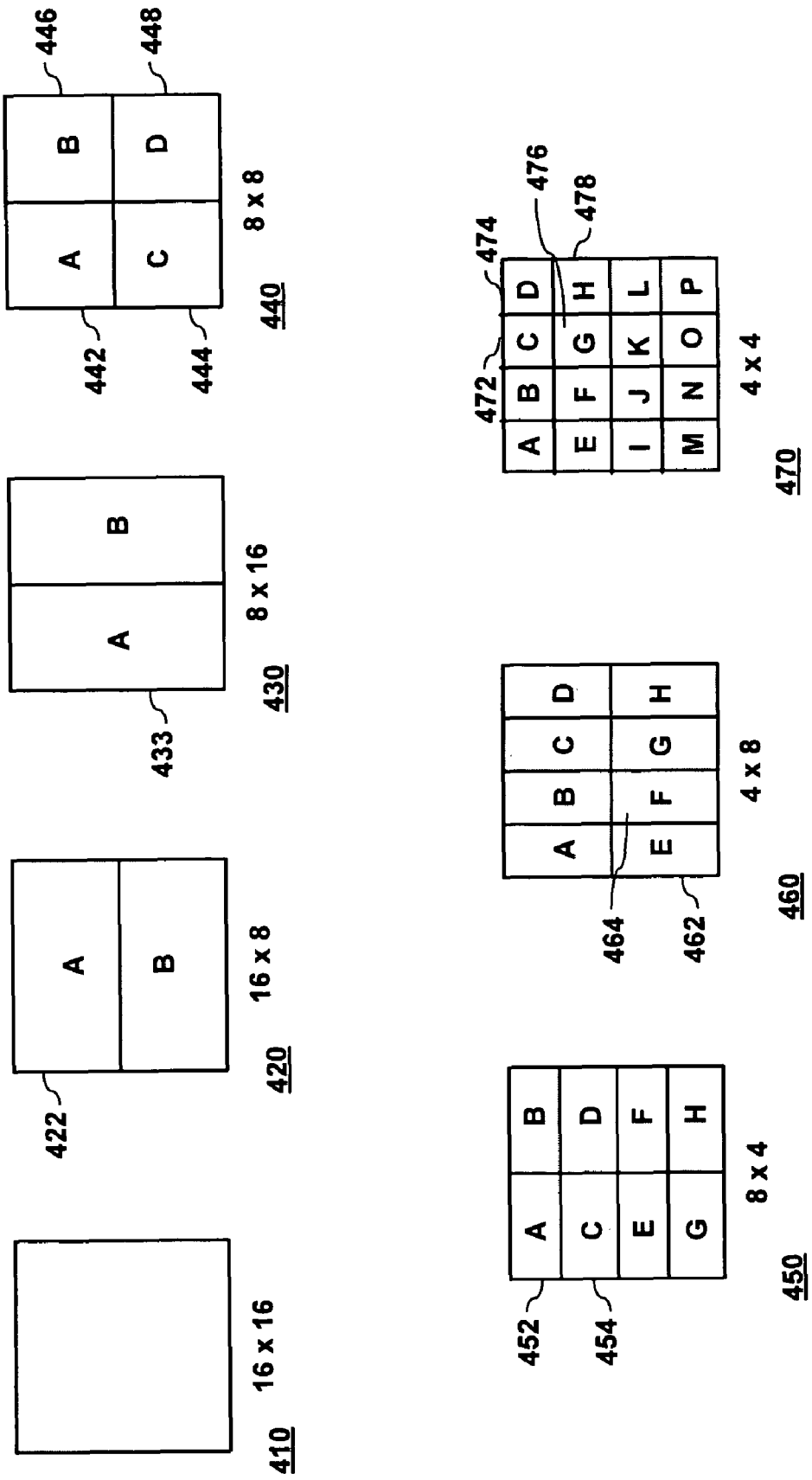
FIG. 4 is a block diagram of modes available for inter-mode encoding according to one embodiment of the invention.

FIG. 4 illustrates exemplary prediction inter-modes that may be used in accordance with an embodiment of the invention. These modes are defined by the H.264 specification and include seven different inter-modes in which a 16×16 macroblock may be partitioned into blocks. A 16×16 mode 410 does not partition a macroblock; rather the entire macroblock is encoded as a single block. A 16×8 mode 420 horizontally divides the macroblock into two 16×8 blocks with each block being individually encoded. An 8×16 mode 430 vertically divides the macroblock into two 8×16 blocks with each block being individually encoded. An 8×8 mode 440 partitions the macroblock into four 8×8 blocks with each block being individually encoded. An 8×4 mode 450 partitions the macroblock into eight 8×4 blocks with each block being individually encoded. A 4×8 mode 460 partitions the macroblock into eight 4×8 blocks with each block being individually encoded. A 4×4 mode 470 partitions the macroblock into sixteen 4×4 blocks with each block being individually encoded.

Generally, the level of complexity and encoding accuracy increases relative to number of blocks in which a macroblock is partitioned and encoded. Thus, if a macroblock contains a significant amount of distortion (i.e., error relative to a reference block) then a mode with more partitioned blocks, such as a 4×4 mode 470, may be used to more accurately communicate the distortion within the macroblock. However, the amount of processor resources and bandwidth requirements that are need for encoding in a 4×4 mode are relatively large compared to the other modes described above. Thus, if there is very little distortion within a macroblock, then a less demanding mode, such as a 16×16 mode 410, may be used in order to preserve resources for encoding other macroblocks.

D. Analysis and Selection of Prediction Inter-Modes

Figure 5:
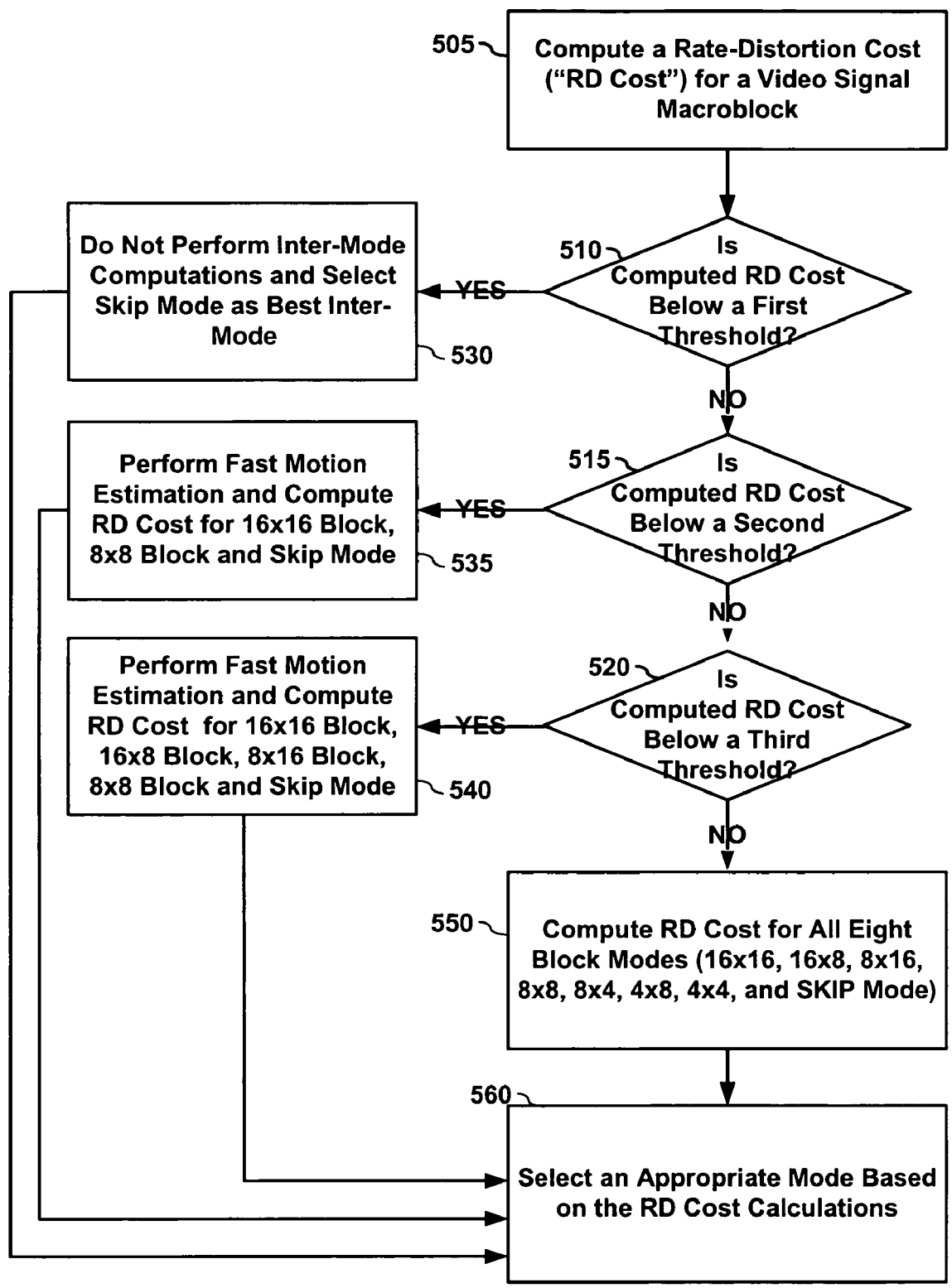
FIG. 5 is a flowchart illustrating a method for analyzing inter-modes according to one embodiment of the invention.

The present invention is adapted to reduce the number of computations that are performed during the analysis and selection of prediction inter-modes for encoding video macroblocks. FIG. 5 illustrates a method for analyzing and selecting an inter-mode for a macroblock according to one embodiment of the invention.

An initial RD cost computation 505 is performed on a SKIP mode for a macroblock to approximate the complexity of encoding required for the macroblock itself. A SKIP mode may be representative of a (0,0) motion vector. This RD cost for the SKIP mode represents the amount of distortion within the macroblock relative to a (0,0) motion vector and is used to approximate which modes should be analyzed. If there is a significant amount of distortion, then the more complex and sub-divided modes are analyzed. If there is very little distortion, then more simple modes are analyzed.

If the calculated SKIP mode RD cost is below a first threshold 510 then the SKIP mode is selected, and no further inter-mode analysis is performed 530.

If the calculated SKIP mode RD cost is at or above the first threshold and below a second threshold 515, then the number of modes that are analyzed to identify a reference block and motion vector is reduced. According to one embodiment, if the SKIP mode RD cost falls between the first and second thresholds, then only the 16×16 mode, the 8×8 mode and the SKIP mode are analyzed. This analysis includes using a reference block and motion vector to perform motion estimation and compute an RD cost for each of the three modes 535.

If the calculated SKIP mode RD cost is at or above the second threshold and below a third threshold 520, then the number of modes that are analyzed is also reduced. According to one embodiment, if the SKIP mode RD cost falls between the second and third thresholds, then only the 16×16 mode, 16×8 mode, 8×16 mode, 8×8 mode and SKIP mode are analyzed 540. Once again, the analysis includes performing motion estimation and calculation of an RD cost for each of the five modes so that an appropriate mode may be selected.

If the calculated SKIP mode RD cost is above the third threshold, then all eight inter-modes (16×16 mode, 16×8 mode, 8×16 mode, 8×8 mode, 8×4 mode, 4×8 mode, 4×4 mode and SKIP mode) are analyzed 550. Additionally, intra-mode calculations may also be made throughout this analysis or made only if an RD cost falls within a particular threshold range. From both the inter-mode and intra-mode analysis and RD cost computations, a particular mode is identified for a macroblock and encoded accordingly.

After the modes that are to be analyzed are identified, computations are performed in the analysis of each of the identified modes, and an appropriate mode is selected for encoding 560. These computations may be reduced by the present invention. As described in detail below, an identified reference block and motion vector for a first mode is leveraged in the identification of reference blocks and motion vectors for the remaining mode.

a) Reference Block and Motion Vector Selection

As discussed in relation to FIG. 3, a search is performed within an area located on each of the reference frames to identify a reference block and motion vector corresponding to each mode that is to be analyzed. The motion vector represents a spatial movement between a reference block to a macroblock, or block within the macroblock. In an attempt to minimize the amount of distortion that is required to be encoded, the search is performed to identify a comparatively similar block, within the reference frames, to the macroblock.

Figure 6:
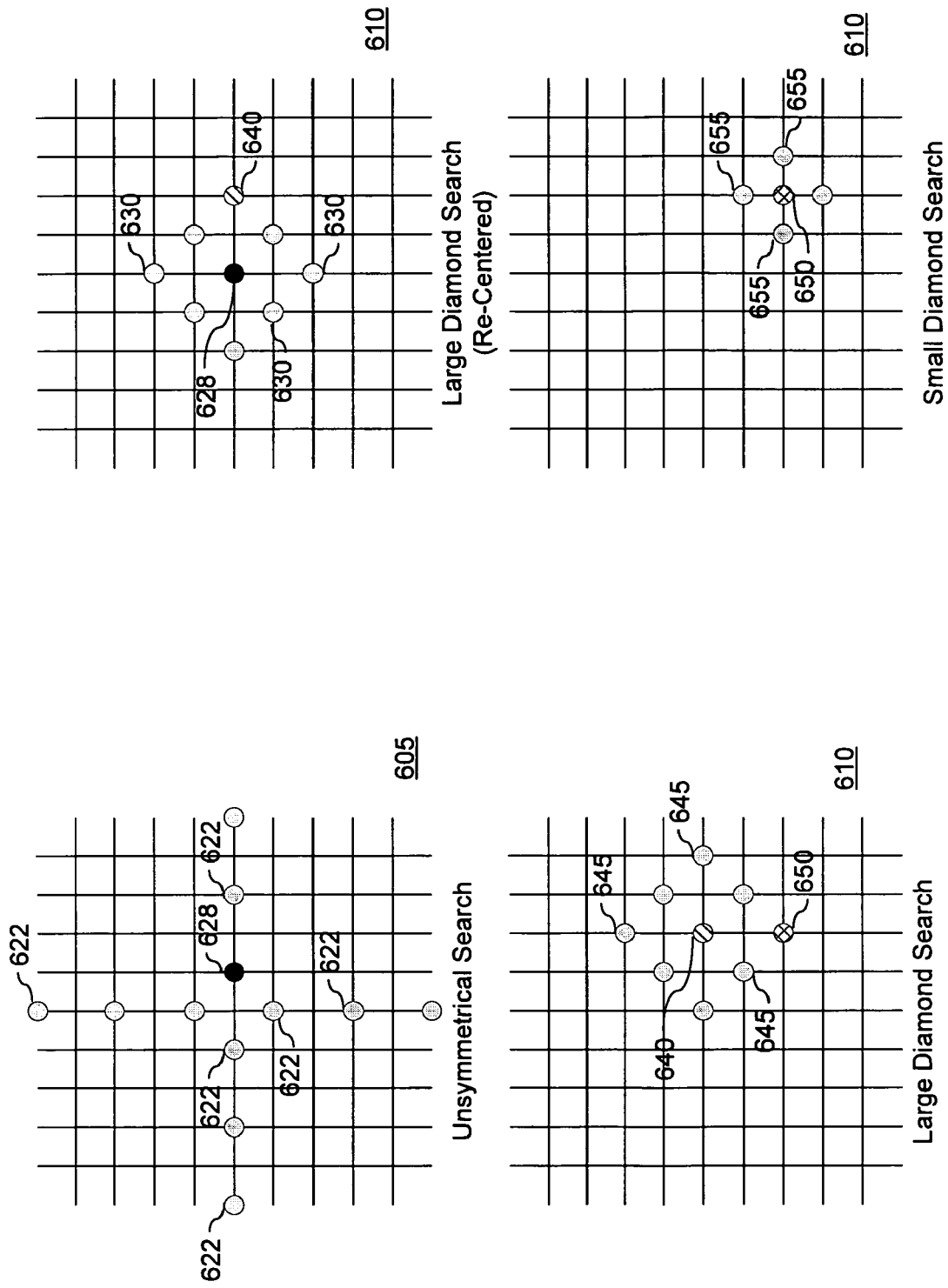
FIG. 6 is an illustration of block search techniques that may be used in identifying a reference block and motion vector for an inter-mode according to one embodiment of the invention.

FIG. 6 illustrates a method of searching for a reference block and motion vector according to one embodiment of the invention. In one embodiment, a search for an 8×8 reference block and motion vector is performed in a searching area in each of the reference frames. A first searching area 605 may correspond to the search area 315 having extended X and Y values of p relative to the edges of an 8×8 block location. In this embodiment, an unsymmetrical, two-dimensional search is initially performed within the search area 605 to identify a block or block location, in which more searching is to be performed and which is most similar to the 8×8 block in the macroblock. This search may be further narrowed via an iterative search process.

The initial unsymmetrical search is performed at specific points along the center X-axis and Y-axis. For example, the center pixel of an 8×8 block, within the macroblock, may be respectively positioned on points 622 along both axes. For illustrative purposes, 12 points 622 are shown, but the search may and preferably does encompass more search points. In one embodiment, there are 30 such points 622 distributed symmetrically along the Y-axis and 14 such points 622 distributed along the X-axis. At each point, the 8×8 block is overlaid onto an 8×8 pixel block having its center pixel at a point 622 in the search area 605 and a corresponding distortion value is calculated. Once each distortion calculation is performed for each 8×8 pixel block having a center point 622, the most appropriate pixel block is selected. This appropriate block is typically the block with the lowest distortion value. For example, as illustrated in this Figure, the 8×8 block with center pixel 628 is representative of such a selected pixel block.

In one embodiment of the invention, the search may be further refined using an iterative series of diamond searches. For example, the search area 610 may be re-centered at the center pixel 628 and a large diamond search performed. In this example, the 8×8 block, within the macroblock, is overlaid onto various 8×8 pixel blocks having center pixels 630 in a diamond shape surrounding the re-centered center pixel 628. A distortion calculation is performed for each of these overlaid pixel blocks and the 8×8 block. If an 8×8 pixel block with lower distortion than the previously selected pixel block (the pixel block with center pixel 628) is identified, then that pixel block with the lowest distortion is selected. For example, as illustrated in FIG. 6, a new pixel block, with center pixel 640, is identified as having the smallest distortion value and is selected.

This diamond search may be performed once again to further refine the search. As shown, another large diamond search is performed around pixel 640 corresponding to the 8×8 block with the smallest distortion that was identified in the previous large diamond search. As a result of this search, another 8×8 pixel block, with center pixel 650, is identified as having a smaller distortion value than the other pixel blocks with center pixels 640, 645. This search may still be further tuned by using a small diamond search around the center pixel 650. This small diamond search may identify an 8×8 block with an even smaller error value than the previous error associated with the 8×8 block with center pixel 650.

In yet another embodiment of the invention, a different search method may be performed to identify reference blocks and motion vectors for various modes. A Sobol scheme, a quasi-random searching method, may be used within a search area to predict a level of distortion between a pixel block within a reference frame a block for which a reference block and motion vector is sought. The Sobol sequence would effectively resample the pixels within a search area and arrange the pixels in a new order such that only a few pixels in the resampled order are examined. An estimate of distortion may be obtained after only a few calculations and a good basis may be provided to continue searching the in pixel block or move on to another pixel block.

One skilled in the art will recognize that the search for a reference block and motion vector may be performed using many different iterative approaches. Furthermore, the reference block does not necessarily need to be an 8×8 block but may be any size. This search results in the identification of a reference block and motion vector that may be used to calculate RD efficiencies of various prediction inter-modes so that an appropriate mode may be selected.

b) Motion Estimation

The number of calculations may be reduced that are performed during motion estimation in identifying a reference block and motion vector for potential modes in which a macroblock may be encoded. According to one embodiment of the invention, a previously identified reference block and motion vector for a first mode is used to identify a reference block and motion vector for a second mode. The use of this previously identified reference block and motion vector provides a starting point or "seed" at which motion estimation for another mode may begin. For example, the 8×8 reference block and motion vector described above may be used to seed the reference blocks and motion vectors for other modes associated with a macroblock.

Using the 8×8 reference block and 8×8 motion vector, reference block(s) and motion vector(s) may be generated for other modes to encode the macroblock. Essentially, the identified 8×8 reference block and motion vector is used as a seed to generate reference blocks and motion vectors for other modes. The manner in which the reference block and motion vector(s) are generated depends on the modes that are being analyzed and used to encode. As an example of how the 8×8 reference block and motion vector may be used to generate reference blocks and motion vectors for other modes, a description of the remaining H.264 mode analysis methods is provided below.

(i) Motion Estimation for 8×4, 4×8 and 4×4 Modes

According to one embodiment of the present invention, an 8×8 reference block and motion vector may be used to seed reference blocks and motion vectors for corresponding 8×4, 4×8 and 4×4 modes. These three modes are associated with the 8×8 mode because they are basically subdividing an 8×8 block in different patterns.

Reference blocks for each of the 8×4 blocks may be identified by searching a search area corresponding to the 8×8 reference block that was previously identified. This search area may be an expanded from the location of the 8×8 reference block along the X and Y axes by a length such as P, as shown in FIG. 3. Referring to FIG. 4, reference blocks for $8\times4_A$ 452 and $8\times4_C$ 454 may be identified by searching a search area related to reference block $8\times8_A$ 442. This search may be performed by overlaying the particular 8×4 block, within the macroblock to be encoded, on various 8×4 pixel blocks within the search area and calculating an associated distortion value. The 8×4 pixel block with the lowest distortion value may be selected as an appropriate 8×4 reference block. Various search methods and patterns may be used to select an 8×4 reference block with appropriate distortion including the large and small diamond search methods described above. Also, a quasi-random Sobol search may also be performed to identify this reference block. Once an 8×4 reference block is selected, the corresponding motion vector is identified, and an RD cost may be calculated for the particular 8×4 mode.

The reference blocks for each of the 4×8 blocks may be identified in a similar manner used in the 8×4 mode. For example, reference blocks for $4\times8_E$ 462 and $4\times8_F$ 464 may be identified by searching a search area related to the reference block $8\times8_C$ 444. A combination of large and small diamond search methods, or quasi-random Sobol searches, may be used to search the search area for the $4\times8_{E,F}$ 462, 464 reference blocks. The motion vectors for $4\times8_{E,F}$ 462, 464 modes may also then be identified from the identified reference blocks and thereafter RD cost calculations performed.

The reference blocks for each of the 4×4 blocks may be identified by searching a search area related to an 8×8 reference block corresponding to the particular 4×4 block. For example, reference blocks for modes $4\times4_{C,D,G,H}$ 472, 474, 476, 478 may be identified by searching a search area related to the reference block for $8\times8_B$ 446. Once again, numerous search methods may be performed to select these 4×4 reference blocks including the iterative large and small diamond search method described above and quasi-random Sobol searching. From these selected 4×4 reference blocks, corresponding 4×4 motion vectors may be identified and corresponding RD cost calculations performed.

One skilled in the art will recognize that the use of the previously identified 8×8 reference block and motion vector in selecting reference blocks for subdivided blocks of 8×8 block reduces the number of computations performed in the selection process. The present invention is not intended to be limited to the use of an 8×8 block as a seed reference block; rather any reference block may be used that can be associated with other modes within a particular macroblock.

(ii) Motion Estimation for 16×16, 16×8 and 8×16 Modes

According to one embodiment of the present invention, the 8×8 reference blocks and motion vectors may be used to seed reference blocks and motion vectors for 16×6, 16×8 and 8×16 modes. These three modes are associated with the 8×8 mode because they are basically comprised of multiple 8×8 blocks in various combinations.

A reference block for a 16×16 macroblock may be identified by combining or averaging multiple 8×8 reference blocks corresponding to the 16×16 macroblock and performing a search within a search region related to the combined 8×8 reference blocks. Referring to FIG. 4, reference blocks for $8\times8_A$, $8\times8_B$, $8\times8_C$, $8\times8_D$ 442, 444, 446, 448 may be combined and a search area generated, perhaps by expanding along the X and Y axes by a distance P, to identify a reference block for the 16×16 macroblock 410. A seed motion vector for the 16×16 macroblock may also be generated by using one or more of the previously calculated 8×8 motion vector or vectors. One method for generating the 16×16 seed motion vector is by averaging the motion vectors for the four 8×8 reference blocks ($8\times8^A$, $8\times8_B$, $8\times8_C$, $8\times8_D$ 442, 444, 446, 448) to a single motion vector.

Using the seed 16×16 motion vector and search area, a search for the 16×16 reference block is initiated at the point to which the seed motion vector is pointing to in the search area. According to one embodiment, the search may be performed by overlaying the particular 16×16 macroblock 410 over 16×16 pixel blocks within the search area and calculating a corresponding distortion value. The 16×16 pixel block with the lowest distortion value is selected as 16×16 reference block. Various search methods may be used to select a 16×16 reference block with appropriate distortion including the large and small diamond search methods described above and quasi-random Sobol searching. Once a 16×16 reference block is selected, the corresponding reference motion vector is identified.

A reference block for a 16×8 block may be also identified by combining or averaging multiple 8×8 reference blocks corresponding to the 16×8 block and creating a search area and starting point to initiate a search. For example, if block $16\times8_A$ 422 (see FIG. 4) is to be analyzed, reference blocks for $8\times8_A$ 442 and $8\times8_B$ 446 may be combined to generate an initial search area for the $16\times8_A$ 442 block. A seed motion vector for the 16×8 block may be generated by using one or more of the previously calculated 8×8 motion vector or vectors. One method for generating the $16\times8_A$ 442 seed motion vector is by averaging the motion vectors for the two corresponding 8×8 reference blocks ($8\times8_A$, $8\times8_B$ 442, 446) to a single motion vector.

Similar to the above-described analysis of a 16×16 macroblock, the seed 16×8 motion vector and search area are used to initiate a search for an appropriate reference block and motion vector for the 16×8 block. According to one embodiment, the search may be performed by overlaying the particular 16×8 block over 16×8 pixel blocks within the search area and calculating a corresponding distortion value. The 16×8 pixel block with the lowest distortion value would be selected as the 16×8 reference frame. Various search methods may be used to select a 16×8 reference block with appropriate distortion including the large and small diamond search methods described above and quasi-random Sobol searching. Once a 16×8 reference block is selected, the corresponding motion vector is identified.

A reference block for an 8×16 block may be identified using a similar approach to the above-described method for a 16×8 block. For example, if block 8×16$_A$ 433 (see FIG. 4) is to be analyzed, reference blocks for 8×8$_A$ 442 and 8×8$_C$ 444 may be combined to generate an initial search area for the 16×8$_A$ reference block. A seed motion vector may be generated by averaging the 8×8$_A$ 442 and 8×8$_C$ 444 motion vectors to find a starting point for the search.

The search for an appropriate 8×16 reference block and motion vector may be performed in a similar manner as described above in which the 8×16 block is overlaid various 8×16 pixel blocks within the search area and distortion values are calculated. This search may include different iterative approaches such as the large and small diamond searches described-above and quasi-random Sobol searching. Once an appropriate 8×16 reference block is selected, the corresponding motion vector is identified, and a RD cost computation is performed for the 8×16 mode.

E. Prediction Mode Selection

After RD costs for each of the inter-modes have been calculated, an analysis may be performed to identify the most RD efficient mode for a particular macroblock. This analysis may also include intra-modes because an intra-mode may be the most appropriate encoding mode for a macroblock. However, in an embodiment of the invention, the intra-mode calculations may be skipped if an inter-mode RD cost falls below a pre-defined threshold. In such an instance, the reduction in computations by not analyzing the intra-modes is more advantageous than potentially identifying a prediction intra-mode that is more RD efficient than the inter-mode with an RD cost below the threshold.

The present invention reduces the processor resources required to effectively select an appropriate mode for a macroblock by leveraging a calculated reference block and motion vector (e.g., an 8×8 block) in identifying reference blocks and motion vectors for other blocks within the same macroblock. One skilled in the art will recognize that various implementations may be used to leverage and associate reference blocks and motion vectors between various modes within a macroblock.

While the present invention has been described with reference to certain exemplary embodiments, those skilled in the art will recognize that various modifications may be provided. Accordingly, the scope of the invention is to be limited only by the following claims.

We claim:

1. A non-transitory medium encoded with instructions for directing one or more processors to perform a method of selecting one of a plurality of inter-modes for encoding a macroblock, the method comprising:

calculating a rate-distortion value representative of the amount of distortion within the macroblock;

reducing the number of potential inter-modes that are to be analyzed for the macroblock based on the rate distortion value, comprising selecting a first set of inter-modes for analysis if the rate-distortion value is below a first threshold, and selecting a second set of inter-modes for analysis if the rate-distortion value is above the first threshold and below a second threshold, the first set of inter-modes being selected from the group consisting of a skip mode, a 16×16 mode, and an 8×8 mode;

identifying a first reference block and first motion vector associated with a first inter-mode; and using the first reference block and first motion vector in performing motion estimation for a second inter-mode.

2. The method of claim 1, wherein the rate-distortion value is a rate-distortion cost of the skip mode for the macroblock.

3. The method of claim 1, wherein the potential inter-modes are defined by the H.264 standard.

4. The method of claim 1, wherein the first reference block and first motion vector are identified using a diamond search in a reference frame.

5. The method of claim 1, wherein the first reference block is used to create a search area within a reference frame to identify a second reference block.

6. The method of claim 5, wherein the first motion vector is used to identify a starting position within the search area.

7. An encoder for selecting one of a plurality of inter-modes for encoding a macroblock, the encoder comprising:

a motion estimation module configured to receive the macroblock and to calculate a rate-distortion value representative of the amount of distortion with the macroblock; and a mode selector module coupled to communicate with the motion estimation module and configured to reduce the number of potential inter-modes that are to be analyzed for the macroblock based on the rate distortion value, the mode selector module being further configured to select a first set of inter-modes for analysis if the rate-distortion value is below a first threshold, and select a second set of inter-modes for analysis if the rate-distortion value is above the first threshold and below a second threshold, the first set of inter-modes being selected from the group consisting of a skip mode, a 16×16 mode, and an 8×8 mode;

wherein the motion estimation module is further configured to identify a first reference block and first motion vector associated with a first inter-mode, and to use the first reference block and first motion vector in performing motion estimation for a second inter-mode.

8. The encoder of claim 7, wherein the rate-distortion value is a rate-distortion cost of the skip mode for the macroblock.

9. The encoder of claim 7, wherein the potential inter-modes are defined by the H.264 standard.

10. The encoder of claim 7, wherein the first reference block and first motion vector are identified using a diamond search in a reference frame.

11. The encoder of claim 7, wherein the first reference block is used to create a search area within a reference frame to identify a second reference block.

12. The encoder of claim 11, wherein the first motion vector is used to identify a starting position within the search area.

* * * * *